United States Patent [19]

da Silva

[11] Patent Number: 5,608,808

[45] Date of Patent: *Mar. 4, 1997

[54] AUDIO-ADAPTED EYEGLASS RETAINER

[76] Inventor: Jean-Pierre M. da Silva, 2093 E. Artesian Way, #31, Salt Lake City, Utah 84121

[ * ] Notice: The term of this patent shall not extend beyond the expiration date of Pat. No. 5,367,345.

[21] Appl. No.: 342,903

[22] Filed: Nov. 21, 1994

Related U.S. Application Data

[63] Continuation-in-part of Ser. No. 835,782, Feb. 14, 1992, Pat. No. 5,367,345.

[30] Foreign Application Priority Data

Oct. 24, 1994 [WO] WIPO ............... PCT/US94/12120

[51] Int. Cl.⁶ .................................................. H04R 25/00
[52] U.S. Cl. .......................... 381/183; 381/68.5; 351/123
[58] Field of Search ............... 381/25, 68.5, 183, 381/187, 188, 205; 181/129; 351/123, 156, 157, 158; 24/3.3, 3.12, 11 P; 2/209; 455/344, 350, 351, 346–349

[56] References Cited

U.S. PATENT DOCUMENTS

| 4,374,301 | 2/1983 | Frieder, Jr. ............................. 379/430 |
| 4,764,962 | 8/1988 | Ekman et al. ............................ 381/25 |
| 4,820,036 | 4/1989 | Seet ....................................... 351/156 |
| 4,856,086 | 8/1989 | McCullough .......................... 455/344 |
| 4,864,646 | 9/1989 | Nesbit et al. ........................... 455/344 |
| 4,882,769 | 11/1989 | Gallimore ............................. 455/344 |
| 4,965,913 | 10/1990 | Sugarman ................................. 24/3.3 |
| 5,020,150 | 5/1991 | Shannon ................................. 455/344 |
| 5,034,995 | 7/1991 | Ciccone ................................. 455/351 |
| 5,100,328 | 3/1992 | Badgley ................................. 351/158 |
| 5,164,987 | 11/1992 | Raven .................................... 381/68.5 |
| 5,367,345 | 11/1994 | Da Silva ................................ 455/350 |

FOREIGN PATENT DOCUMENTS

3509658A1  9/1986  Germany .
59-223096  of 1984  Japan .

Primary Examiner—Curtis Kuntz
Assistant Examiner—Huyen D. Le
Attorney, Agent, or Firm—Trask, Britt & Rossa

[57] ABSTRACT

A hollow, strap-like eyeglass retainer (20) which provides audio electronic connections to interact with radio or other audio signal producing equipment (46) and audio speakers.

5 Claims, 5 Drawing Sheets

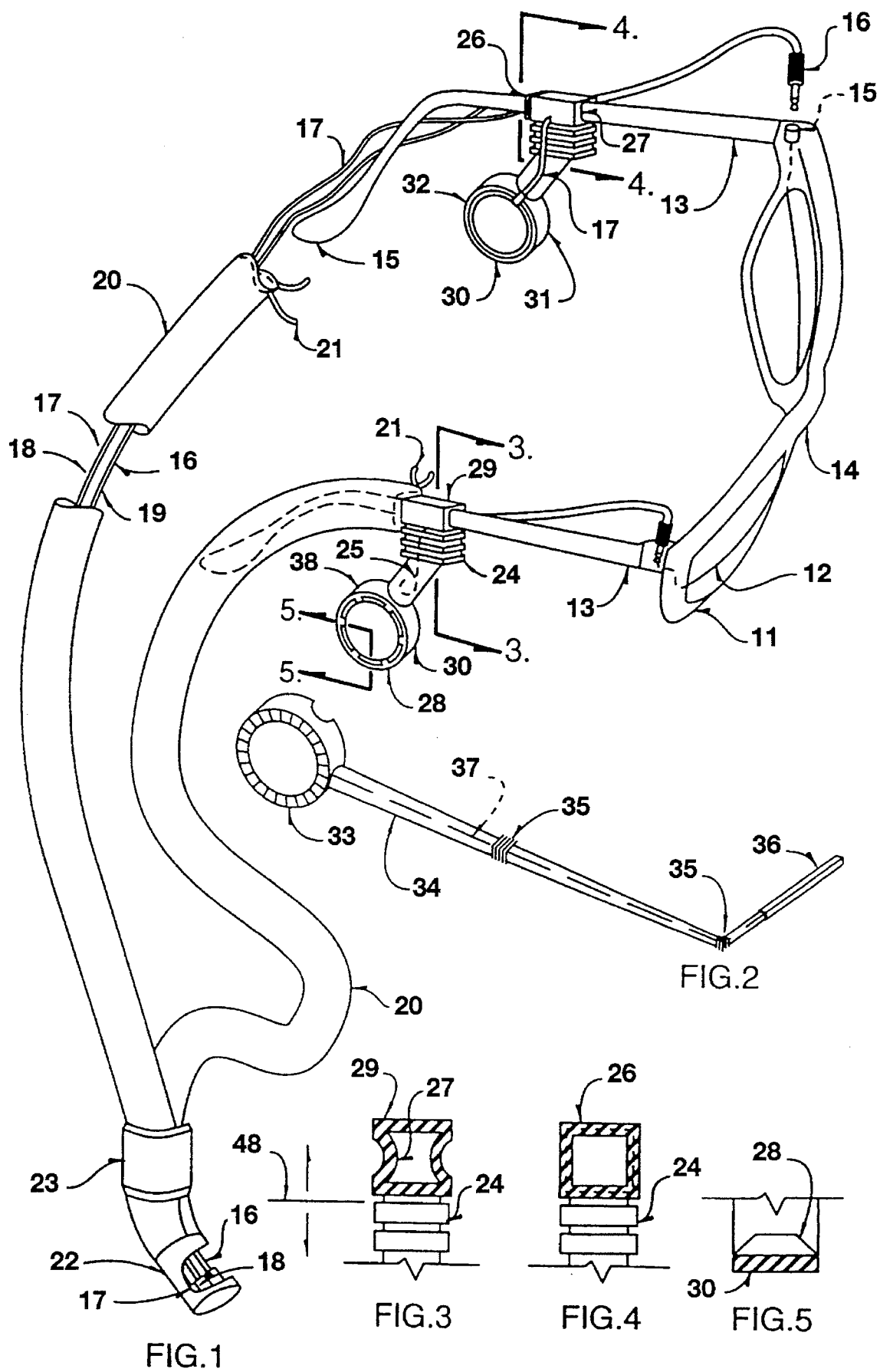

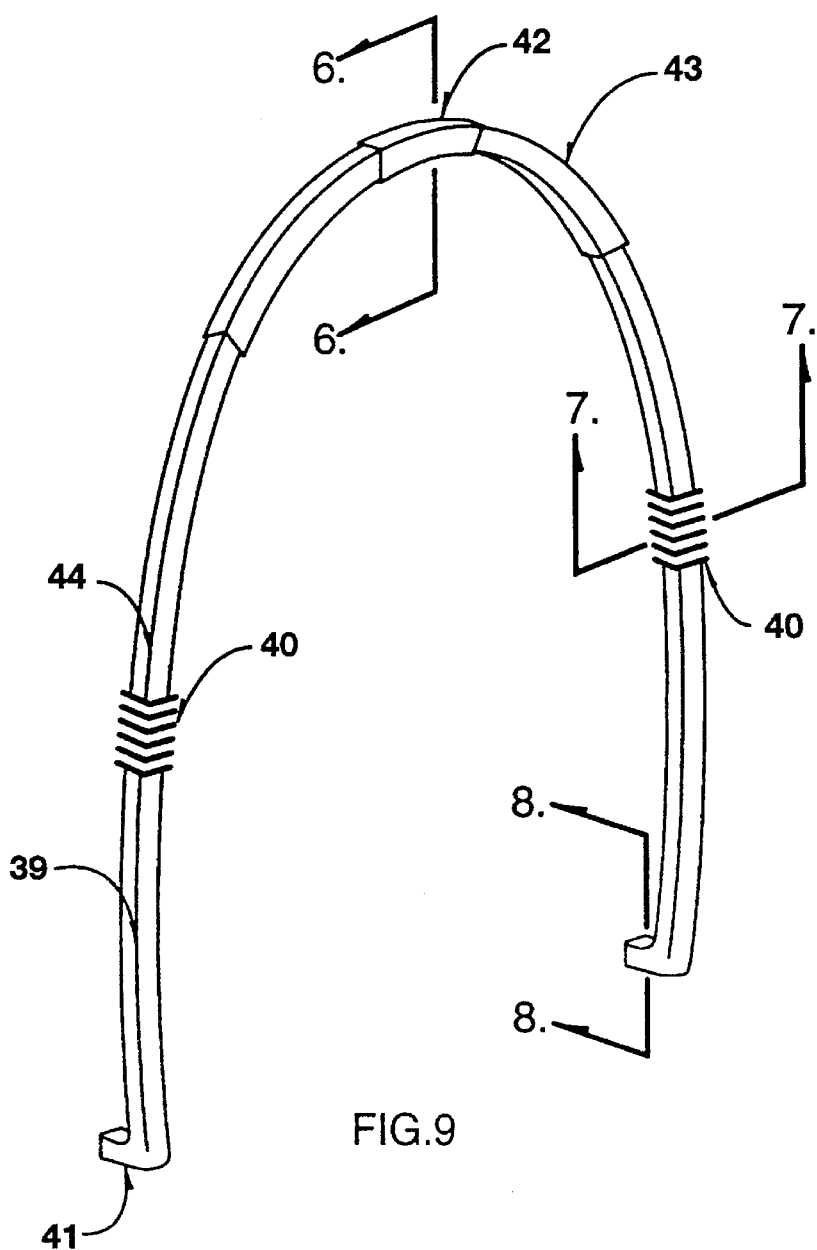
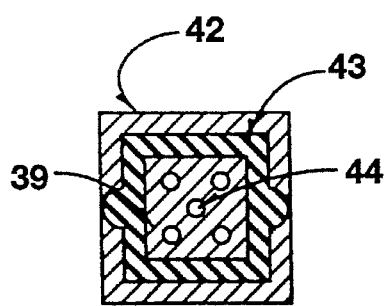
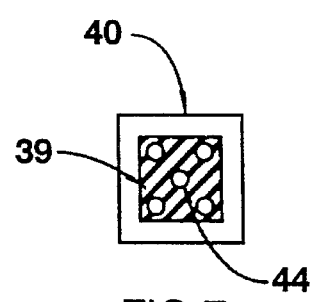
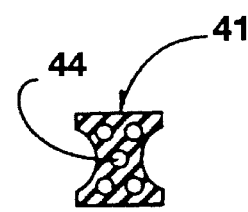
FIG.9
FIG.6     FIG.7     FIG.8

AUDIO-ADAPTED EYEGLASS RETAINER

RELATED APPLICATION

This application is a continuation-in-part of application Ser. No. 07/835,782 filed Feb. 14, 1992, (U.S. Pat. No. 5,367,345—Nov. 22, 1994).

TECHNICAL FIELD

The invention relates to sound headset systems for attachment to eyeglasses via a neck-strap retainer (spectacles).

BACKGROUND ART

Related devices to the instant invention are stereo earphones, headsets, radio glasses and eyeglass retainers as cited in certain United States and foreign patents.

Headsets, headphones, eyeglass retention and radio glasses are generally shown in one or more of the following United States and foreign patents: U.S. Pat. No. 4,882,769 (Gallimore), the disclosure of which relates to an AM/FM radio supported and mounted within a pair of sunglasses; U.S. Pat. No. 4,856,086 (McCullough), which describes an electronic device mounted in the temple of a pair of eyeglasses; U.S. Pat. No. 4,965,913 (Sugarman), which illustrates a strap for retaining glasses about the neck ready for convenient use; U.S. Pat. No. 4,820,036 (Seet) describes a headband for retention of glasses; U.S. Pat. No. 4,864,646 (Nesibit et al.) has a speaker and radio in a wide, flat strap; U.S. Pat. No. 4,764,962 (Ekman et al.), describes a typical "WALKMAN" carrier; Japanese Patent No. 59-223096 (Seiko Denshi Kogyo) and West German Patent No. DE3509658-A1 (Eberhardt) show typical headsets.

None of these references cited appear to arrange an AM/FM stereo radio into an eyeglass retainer form having a comfortable flexible cloth strap or buoyant rubber tube and/or the like, concealing an antenna, electrical wires and/or air hoses wherein the retainer is adapted to be connected to a set of expandable eyeglass. An earpiece supported by a flexible arm attached directly or intermediately to the retainer forms a housing for a micro AM/FM stereo with speakers.

DISCLOSURE OF THE INVENTION

The instant invention relates to a unique assembly for modifying a pair of spectacles to provide an audio system juxtaposed next to the ears of a wearer of the spectacles. The assembly includes a spectacle retainer containing wiring necessary for receiving a radio signal and wiring to interconnect certain electronic and/or audio components of the invention. The assembly further includes fastening means to fasten the retainer to the temples of a pair of spectacles wherein said retainer fastener means further includes conduit means to allow communication between the writing in said retainer and certain electronic and/or audio components attached directly or indirectly to the retainer fastener means. Earphone speakers are supported by a flexible arm support attached directly or indirectly to said retainer fastener means. The flexible arm support preferably contains a miniature audio receiver.

This invention is not only lightweight and easy to operate, but unique and useful because of its organized structure engineered to accommodate attachable items such as a microphone, headgear batteries, solar cells, extension cords and electronic eyeglasses with defogable lenses.

This invention is to be used by the public and has a variety of practical applications.

An important feature of the invention is to arrange an AM/FM radio wherein certain components such as the antenna and certain wiring can be incorporated into an eyeglass retainer which will fit on most eyeglass stems or frames. The retainer preferably is constructed in a tubular shape from a material such as cloth, leather, rubber, neoprene, plastic or a similar synthetic.

A pair of eyeglass stem sleeves are attached at the free ends of the eyeglass retainer to secure the retainer to the spectacles. The stem sleeves form a housing which preferably includes a flexible arm and support structure to hold an AM/FM radio with speakers and/or the like. A pair of drawstrings are preferably used to attach the eyeglass retainer to the eyeglass stem sleeves.

Another feature of the present invention is a bead located on or near the tail end of the eyeglass retainer. This bead may slide along the eyeglass retainer to change its length and may also be formed into a housing to hold a radio, solar cell and/or the like.

The present invention may also include an accessory jack located on the tail end of the eyeglass retainer to connect to an extension cord.

The audio-adapted eyeglass retainer is structured to accommodate attachable items such as a microphone, headgear, solar cells, batteries, extension cord and electronic eyeglasses which have defogable lenses and/or electronic readout lenses.

BRIEF DESCRIPTION OF THE DRAWINGS

In the drawings, which depict presently preferred embodiments of the invention and in which like reference numerals refer to like parts in different views:

FIG. 1 is a perspective view of the preferred embodiment of this invention connected to a pair of defogable eyeglasses with electronic readout lenses;

FIG. 2 is a perspective view of the attachable microphone;

FIG. 3 is a sectional view of the eyeglass stem sleeve and attachable temple piece taken along line 3—3;

FIG. 4 is a sectional view of the eyeglass stem sleeve flange and attachable temple piece taken along line 4—4;

FIG. 5 is a sectional view of a housing engineered to hold a speaker, micro radio, battery, solar cell and/or the like, taken along line 5—5;

FIG. 6 is a section illustrating accessory leads, headgear, head-sizing bracket and attachment bracket for micro radio, solar cell and/or the like taken along line 6—6;

FIG. 7 is a section illustrating headgear, flexible joint and accessory wires, taken along line 7—7;

FIG. 8 is a cross section illustrating headgear attachment stud and accessory leads taken along line 8—8;

FIG. 9 is a perspective view of the headgear;

BEST MODE OF THE INVENTION

Figure 10:
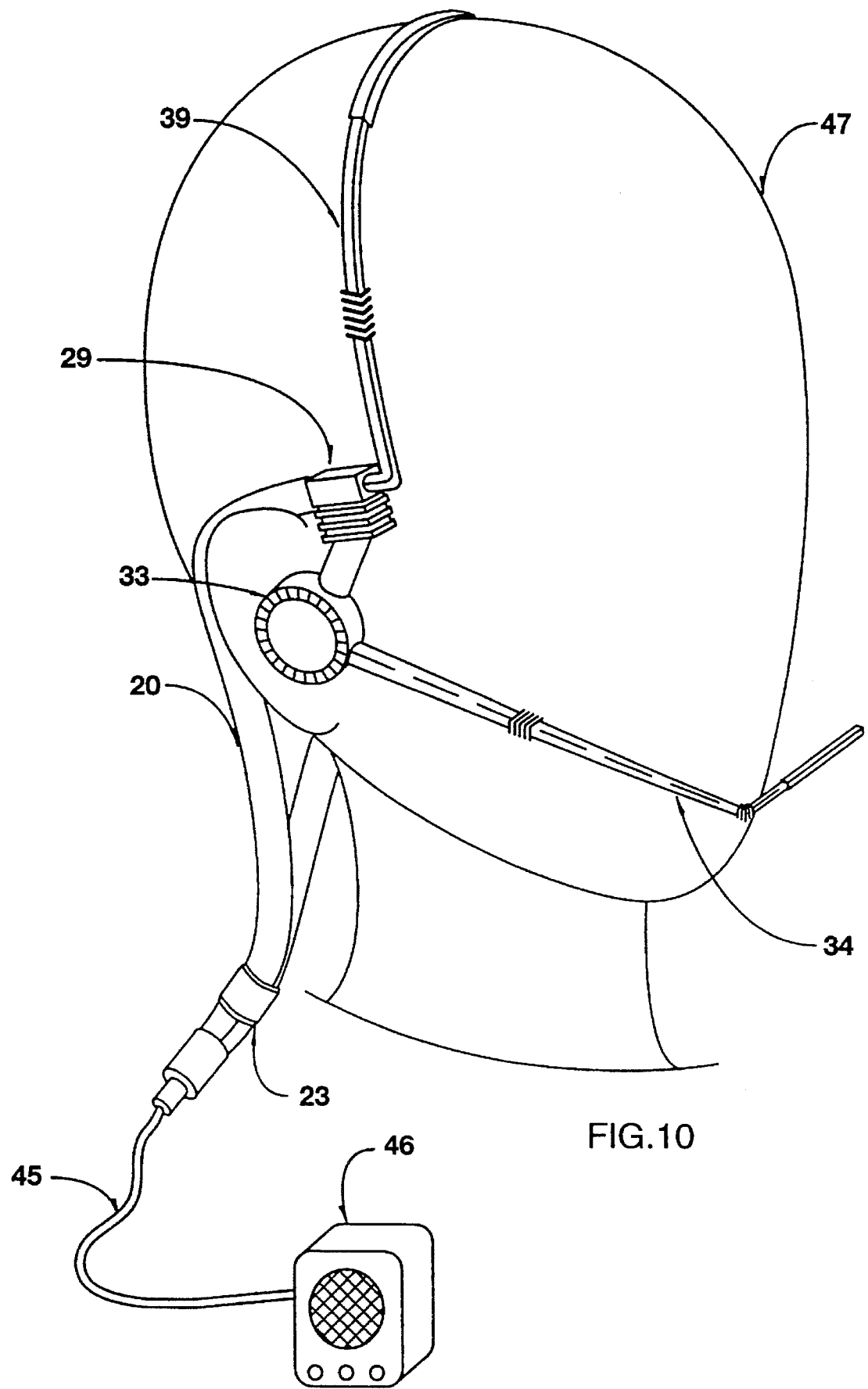
FIG. 10 is a perspective view of a person wearing the invention and some of its attachable accessories.

FIG. 1 shows an audio-adapted eyeglass retainer 20 consisting of two comfortable 34.3 centimeters long by 1.0 centimeter diameter (13.5 inches by 0.4 inch) diameter flexible cloth straps having an open bore and/or buoyant rubber tubes fastened together at one end by a cylindrical plastic end patch 22. This end patch 22 houses accessory jacks connected to speaker wires 17, electric wires 16, antenna 18 and hoses 19. These leads are located and concealed inside the strap and are connected to a right and left earpiece 30 with end caps 31 located at the straps' two free ends. These rubbery earpieces 30 are annular in shape, having a ring portion of about 1.9 centimeters (0.75 inches) in outer diameter by 0.96 centimeters (0.376 inches) wide with an inner diameter of about 1.6 centimeters (0.628 inches). The inner diameter is ribbed with flexible fins 28 shaped to conform about various component configurations such as a 1.52 centimeters (0.6 inches) Ø micro radio, speakers, solar cells and/or the like 38. This ring portion has a rearwardly extending arm 24 about 3.0 centimeters (1.165 inches) in length by about 0.64 centimeters (0.25 inches) in diameter with a flexible joint 25 which has bending and memory properties.

Located at the top of the extending, flexible arm 24 and preferably integral therewith is a stem sleeve end 29 about 2.3 square centimeters by 1.44 centimeters long (0.36 square inches by 0.565 inches long) with an internal bore 27 designed to have an hourglass shape to grip on to most eyeglass stem configurations 13. This stem sleeve 29 has a 1.88 square centimeter by 0.16 centimeter thick (0.292 square inch by 0.063 inch thick) flange 26 designed to attach to the eyeglass straps' two free ends, by means of a drawstring, glue, fasteners and/or the like 21. The stem sleeve supports the flexible arms which can be adjusted to place the earpieces proximate the ears of a person wearing the spectacles to which the audio-adapted retainer is attached.

Located at the fastened end of the electrical eyeglass retainer near the end patch 22 them is a slider 23 which is illustrated as a cylindrical cinch bead, with an internal bore of about 0.48 centimeters (0.188 inches) in outside diameter by 1.13 centimeters (0.443 inches) in inside diameter by 0.86 centimeters (0.338 inches) long. This bead 23 may slide along the strap 20 to change its length, for neck adjustment, and it may also be engineered to function as a micro radio, solar cell and/or the like.

The audio-adapted eyeglass retainer has been engineered to fit most eyeglass stems 13, yet in FIG. 1 the electrical eyeglass retainer 20 is attached to a pair of defogable eyeglasses 11 which have accessory jacks 15, lights or controls 14 and electronic readout lenses 12.

FIG. 2 shows a perspective view of an attachable microphone 34. This microphone when fully extended is about 22.9 centimeters (9 inches) in length consisting of a tubular body about 0.48 centimeters (0.1875 inches) in outside diameter by 0.16 centimeters (0.0625 inches). At one end of this hollow plastic, graphite and/or the like body member there is a mouth piece 36. This mouth piece may be surrounded by acoustical foam and transmit sound through leads 37 inside the hollow body member which is attached to an end cap receiver 33 located at the opposite end of the mouth piece 36. This end cap receiver 33 has been engineered to snap onto and make electrical contact to said annular arm-shaped earpiece 30. This microphone has push button and rotational movement along the end cap as well as flexible joints 35 with memory for head adjustment.

FIG. 3 shows an enlarged sectional view of the stem sleeve 29 located at the top of the extending arm 24. This stem sleeve end 29 may slide onto most eyeglass stems 13 with an internal configuration 27 sized and structured to grip by friction onto the eyeglass stems 13 when in a comfortable ear location. This stem sleeve 29 may also detach from the extending arm 24 at part line 48 taken along line 3—3 in FIG. 1. The stem sleeve 29 contains an opening or bore suitably sized to permit passage therethrough of any wire or conduits contained within the retainer strap to pass into or along the flexible arm and into components held at the lower end of said arm.

FIG. 4 is an enlarged sectional view taken along line 4—4 in FIG. 1 showing the stem sleeve end of the extending arm 24 showing a flange 26 used to attach to the eyeglass strap preferably by use of a drawstring, glue and/or the like 21.

The sleeve end 29 may, of course, be an integral part of the retainer strap.

FIG. 5 is a sectional view taken along line 5—5 in FIG. 1. This view shows a portion of the earpiece 30 and internal fin or spacer 28 used to conform about internal components such as a micro radio, speakers, solar cell and/or the like 38. These rubbery fin spacers are about 0.9 centimeters (0.36 inches) in length by 0.96 centimeters (0.376 inches) wide by 0.25 centimeters (0.01 inches) thick.

FIG. 9 shows a perspective view of an attachable headgear 39. This 1.21 square centimeter (0.1875 square inch) plastic, graphite bar-shaped body has a U-shaped form about 15.2 centimeters (6 inches) in radius with rubbery flexible joints 40 with memory internal wires 44, head-sizing brackets 43 for head adjustment, accessory clip 42 and attachment studs 41 located at each end of the U-shaped headgear. These studs 41 may plug into the stem sleeve of the earpiece 29 and may complete electrical contact with the earpiece 30.

FIG. 6 is a cross-sectional view taken along line 6—6 in FIG. 9 showing an accessory attachment clip 42, head-sizing bracket 42, headgear 39, internal wires 44 and/or the like.

FIG. 7 is a cross-sectional view taken along line 7—7 in FIG. 9 showing internal wires 44, headgear 39 and a rubbery flexible joint 40.

FIG. 8 is a cross-sectional view through line 8—8 showing an attachment post 40 with internal wires 44. These components may plug into the stem sleeve end of the extending arm located on the earpiece 29.

FIG. 10 is a perspective view of a person wearing an electrical eyeglass retainer 20 with attachable items such as headgear 39, microphone 34, accessory wires 45, radio, compact disc, tape player, phone and/or the like 46.

Figure 11:
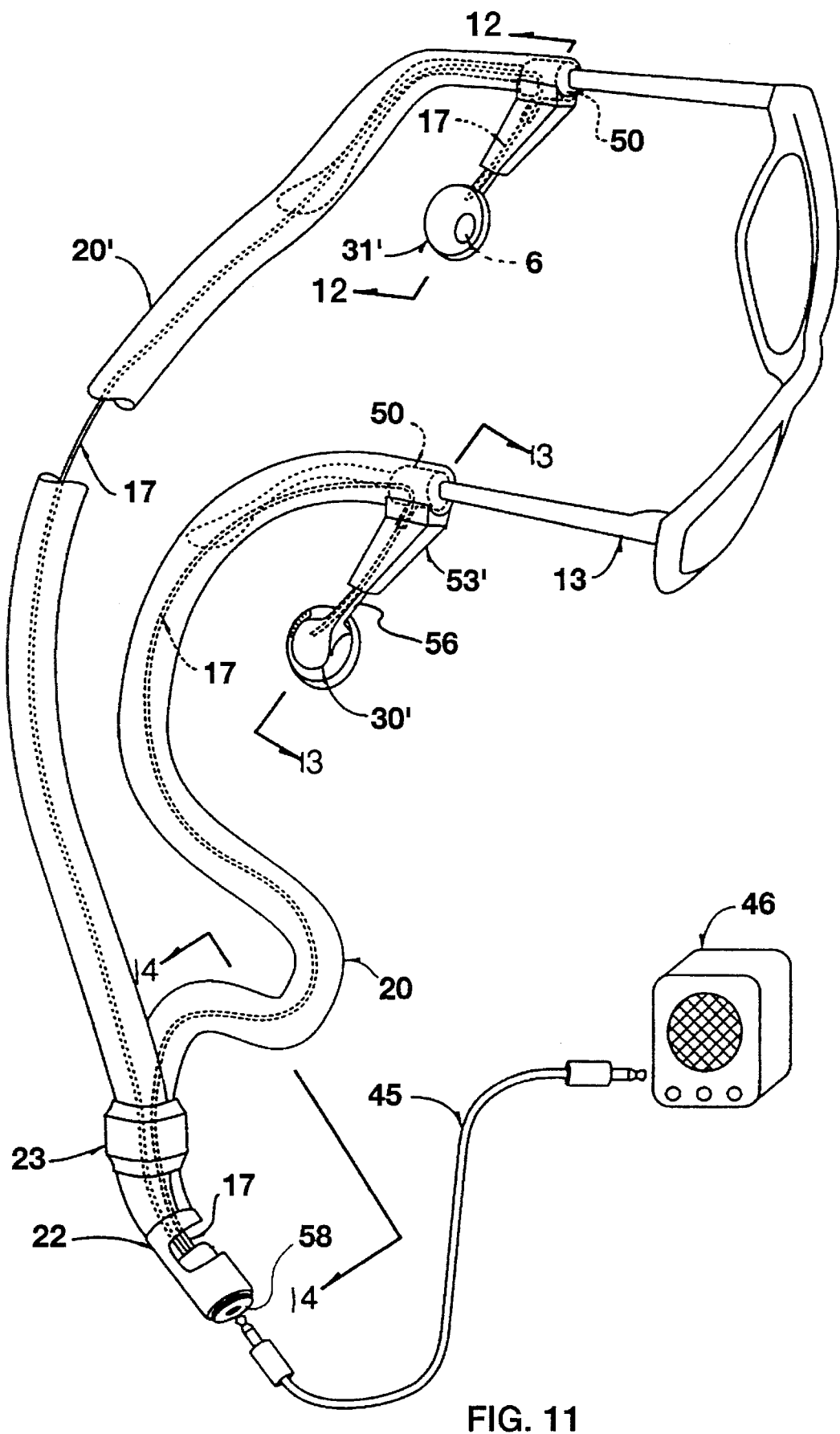
FIG. 11 is a perspective view of an alternative embodiment of the invention connected to a pair of eyeglasses.

An alternative means of securing the eyeglass retainer to the spectacle temples and providing a depending speaker support is illustrated in FIG. 11. This means includes a flexible or resilient cylinder 50, identified herein as the "temple cylinder", sized and adapted to fit snugly within a hollow sleeve 51 of the eyeglass retainer 20'. The interior longitudinal bore of the cylinder is sized and adapted to fit snugly over a typical earpiece (free end) of the temple of a pair of spectacles.

Figure 12:
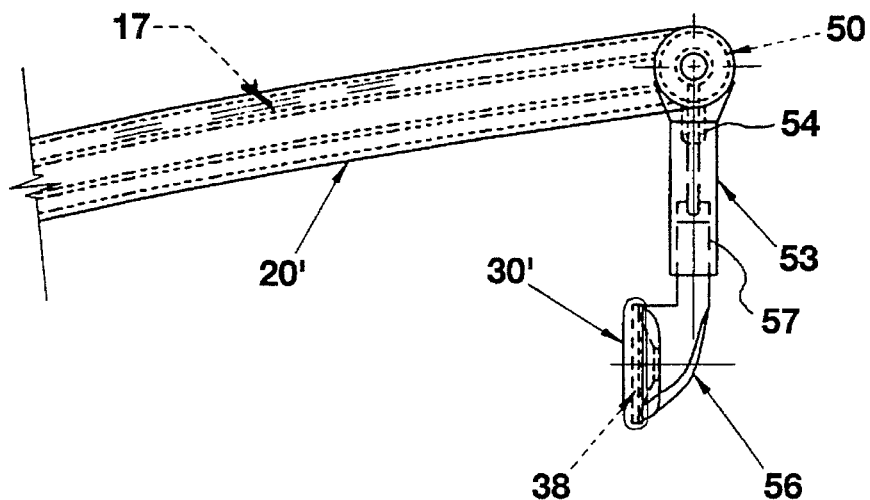
FIG. 12 is a sectional view of the alternative embodiment of the invention depicted in FIG. 11, taken along line 12—12.
Figure 13:
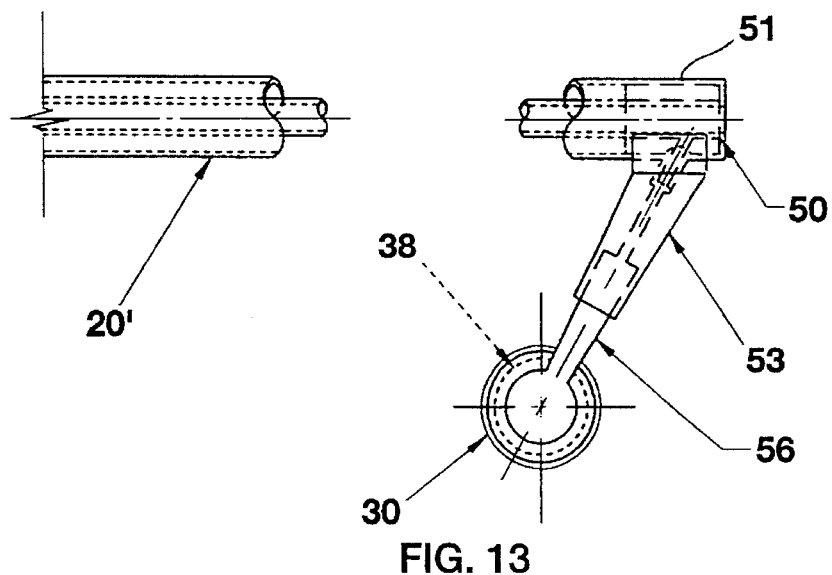
FIG. 13 is a sectional view of the alternative embodiment of the invention depicted in FIG. 11, taken along line 13—13.

The flexible cylinder, see FIG. 12, typically made of flexible polyethylene plastic or the like, has an opening its side wall sized and adapted to permit a thin insulated electrical conductor (wire) 17 to pass through the cylinder and through the fabric of the flexible hollow sleeve 51 to pass into a speaker holder support.

The speaker holder support is preferably composed of two members; an upper member 53 sized and adapted to be secured to the external surface of the flexible hollow sleeve adjacent the temple cylinder. The upper hollow speaker holder support member can be secured to the sleeve by glue or it may be secured to a hollow post 54 projecting from the temple cylinder. This post member 54 may be an integral part of the temple cylinder 50 or it may be a separate member which is glued to the cylinder and then to the upper speaker support member 53. Use of a post member to secure the upper speaker support member to the temple cylinder requires an opening in the wall of the flexible hollow sleeve for the post to pass through.

The upper speaker support member 53 may be attached securely to the sleeve by glue, especially if the sleeve is glued to the temple cylinder. A hollow axial bore in the upper speaker support member 53 is aligned with the sidewall opening in the temple cylinder to provide an internal path for the speaker wire to follow so that it may be attached to a speaker at one end pass through the hollow retainer straps 20 and to the electrical jack at its other end, the electrical jack 58 located at the juncture of the free ends (cylindrical end patch 22) of the hollow sleeve members.

The upper speaker support member 53 is preferably semi-rigid and made from a plastic material. The degree of rigidity is preferably sufficient to hold the structure in position once it is secured to the hollow cylinder. The upper speaker arm 53 and the lower arm 56 attached to it are preferably positioned at a slight angle to the longitudinal axis of the hollow cylinder so that the speaker arm, when the retainer 20' is in position on the spectacle temple, positions its speaker to be alongside the opening of the ear of a wearer or when the speaker is small, to be in the ear. The total length of the speaker arm is such that it positions its speaker alongside the opening to the ear. A typical length from the center of the speaker to the hollow cylinder is about 1.3 centimeters to 7.6 centimeters (one-half to three inches).

The lower speaker arm 56 fits within a cavity 57 at the bottom of the upper arm 53. At the bottom of the lower arm is a ring-like speaker holder 30' which grips a speaker in a manner similar to that illustrated in FIG. 1. The lower speaker arm also has an internal base (not shown) so that speaker wires 17 (see FIG. 11) can pass internally to the speakers 38.

The dimensions set forth herein are generally preferred for certain preferred embodiments of the invention; however, deviations and variations to these dimensions may be made while still retaining the general structure and function of the invention.

A preferred embodiment of the instant invention utilizes the retainer strap to hold a pair of spectacles in place on the ears during activity, such as jogging, etc. or to hold the spectacles in place on the chest with the retainer straps around the neck. Further, in such an embodiment, the retainer strap preferably contains wires which interconnect, electronically, the pair of earpieces with one another and especially where one earpiece contains a micro radio and the other contains a speaker. Such an embodiment is fully integrated with the retainer strap and earpieces interconnected and containing a battery, either in the strap or in one of the earpieces, a radio and speakers so that upon being fitted to a pair of spectacles, a convenient radio/head phone device is available to anyone wearing such a device and spectacles.

Figure 14:
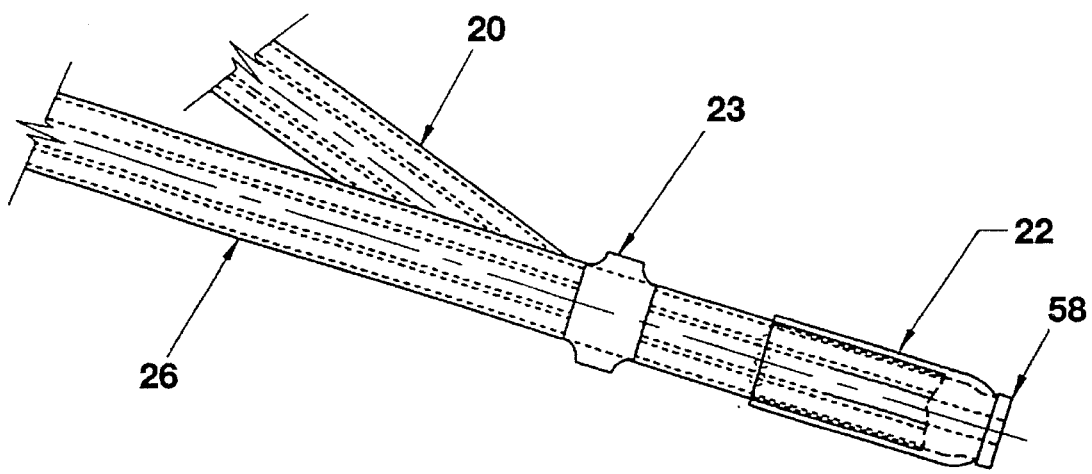
FIG. 14 is a sectional view of the alternative embodiment of the invention depicted in FIG. 11, taken along line 14—14.

As shown in FIG. 14, one embodiment of the invention utilizes the retainer strap 20' as a conduit to electronically interconnect the earpieces but also, via a jack 58 attached to the retainer strap and electronically wired within the strap to communicate to the earpieces, a remote radio, tape player or other electronic receiver/transmitter, etc. may be readily operably associated with the audio-adapted spectacle retainer. For example, a miniature tape recorder 46 carded on one's belt or in a pocket could be connected to the jack 58.

The hollow stem sleeve 29 (see FIG. 1) is a unique member facilitating the fastening of a hollow retainer strap having an open end to the stem sleeve while providing conduit space within its internal bore. The shape and structure of the internal bore is such that the semi-flexible nature of the sleeve enables it to grip the stem of a pair of spectacles in a manner to securely hold the sleeve (and retainer strap) to the spectacles while providing an internal conduit space for the passage of small wires, tubes and the like from the retainer strap, through the sleeve to permit their being connected to an electrical and/or audio accessory or other accessory.

The sleeve 29 further has preferably a depending arm which is structured and adapted to hold some audio and/or electrical accessory in a desirable position relative to the stem sleeve, the spectacles and to some portion of the anatomy, e.g. the ears, of a person wearing the spectacles.

This accessory support arm preferably contains a born through which wires, tubes, etc. may be passed from the internal bore of the sleeve on to some electrical and/or audio component or other component. The accessory arm is preferably semi-flexible with sufficient stiffness to stay in some selected position once the arm has been moved into that position. The accessory arm may be permanently affixed to the sleeve or it may be made detachable, e.g. by use of a tongue and groove joint or other fastening means.

The retainer strap may be fastened permanently to the sleeve or it may utilize a drawstring, integral, expandable "0" ring or the like secured at the open end of the strap to make a secure but detachable connection to the flange or other fastening means provided on the sleeve to accommodate the interconnection between the strap and sleeve.

The instant invention provides a unique, advantageous manner of modifying virtually any pair of spectacles with an audio, electrical or other capability.

Other variations and embodiments utilized in the instant invention are, of course, possible and it is intended that the invention have the scope embodied within the appended claims.

I claim:

1. An audio headset adapted to be attached to standard eyeglass spectacles having temples and ear-fitting members comprising:

a pair of flexible, hollow sleeve members each having an internal bore sufficiently large to slide over the ear-fitting member of the ends of eyeglass temples and accommodate electrical conductors, and having two pairs of free ends, one pair adapted to slide over the ends of eyeglass temples and another pair of free ends, one free end from each flexible hollow sleeve member adapted to fit into an end patch containing an accessory jack, said end patch joining said free ends together, said flexible hollow sleeve members when formed together being sufficiently long to at least fit behind the head of a wearer of said flexible hollow sleeve members when said one pair of free ends of said flexible hollow sleeve members are attached to eyeglass spectacles;

an earpiece speaker attachment, said earpiece speaker attachment having means to attach to each of said eyeglass temples to adjustably support at least one miniature speaker adjacent the ear of a wearer of said eyeglasses and having means adapted to interact with said flexible hollow sleeve members to accept and hold in position one pair of free ends of said flexible sleeve members; and an end patch member adapted to contain an electrical jack for electrically interconnected external electronic components to said audio headset and to join one pair of the free ends of said flexible sleeve members together.

2. The audio headset of claim 1, wherein said hollow sleeve contains electrical conductors.

3. The audio headset of claim 2, wherein at least one of said electrical conductors is adapted to connect at one end to a miniature speaker.

4. The audio headset of claim 3, wherein at least one of said electrical conductors is adapted to connect to a radio.

5. The audio headset of claim 1, wherein said hollow sleeve contains a flexible antenna member adapted at one end to connect to a radio.

* * * * *